Oct. 19, 1954  L. A. McCORMICK ET AL  2,692,134
SPRING DAMPENING MEANS
Filed June 29, 1950

INVENTOR.
Lloyd A. McCormick & Edward H. Lindeman
BY
ATTORNEYS.

Patented Oct. 19, 1954

2,692,134

UNITED STATES PATENT OFFICE 2,692,134

SPRING DAMPENING MEANS

Lloyd A. McCormick, Niles, and Edward H. Lindeman, Detroit, Mich., assignors, by direct and mesne assignments, to The Studebaker Corporation, South Bend, Ind., a corporation of Delaware Application June 29, 1950, Serial No. 171,084

3 Claims. (Cl. 267—49)

Our invention is concerned with a new and improved means for dampening the flexing movements and oscillations of composite leaf springs, commonly employed in automotive vehicles of a variety of classes, and having particular application to passenger automobiles.

More specifically, our invention is directed to a composite liner construction adapted to be inserted between adjacent leaves of a composite leaf spring to produce improved frictional and wear characteristics of the leaf spring construction.

Briefly, our invention comprises a friction dampening liner which is adapted to be held in position between a pair of adjacent leaf spring members of a composite leaf spring, or the like, by a compressible rubber button; the rubber button also serving to give a viscous longitudinal and lateral dampening effect to the flexing movements of the composite spring, much as if a hydraulic braking action were being applied to the spring leaves. The viscous effects of the rubber dampener are designed to have a greatest effect at the lighter loads on the spring, while the dampening liner provides attritional dampening at the heavier loads. This construction also eliminates spring squeaking and the accompanying need for lubrication of the springs.

One of the main objects of our invention is to provide a new and improved combined frictional and viscous liner for use with composite leaf springs which has the characteristics of a combined straight frictional dampener with that of a viscous dampening at light loads for a longitudinal and lateral flexing movement of adjacent spring leaves.

Another important object of our invention is to provide a composite leaf spring dampener construction in which there is substantially an elimination of metal-to-metal contact between adjacent spring leaves, resulting in a marked reduction of spring squeak.

Another object of our invention is to provide a dampening means for use with composite leaf springs whereby the lighter static loads thereon are resiliently dampened by compressible rubber means which also provides a viscous dampening effect both longitudinally and laterally of the spring, thereby resulting in a lessening of the lateral shake of an automobile body being supported by said spring.

Still another object of our invention is to provide an attritional dampening liner means between adjacent leaves of a composite leaf spring which increases interleaf friction, whereby the power or brake hop of an automobile utilizing such a spring will be substantially reduced.

These and further objects and features of our present invention will become apparent from the following descriptive materials, which are directed to those familiar with this art, and in light of the accompanying drawings in which.

Figure 2:
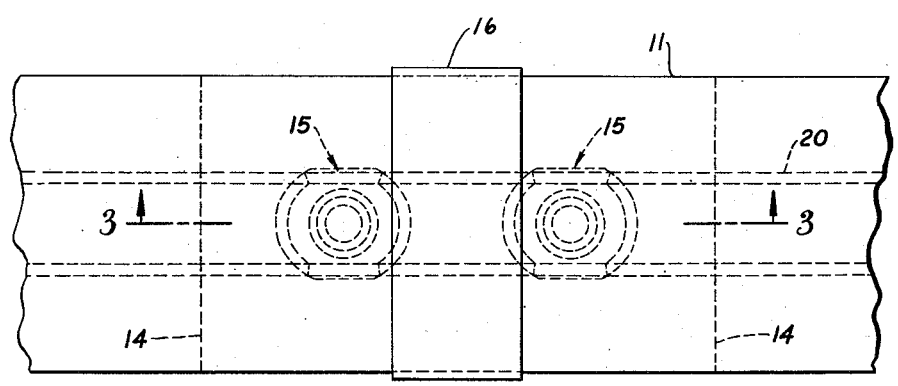
Figure 2 is an enlarged top plan view of a portion of the spring shown in Figure 1, wherein our dampening means is inserted between adjacent leaves thereof, showing the disposition of the frictional liner and rubber buttons of our dampener.
Figure 3:
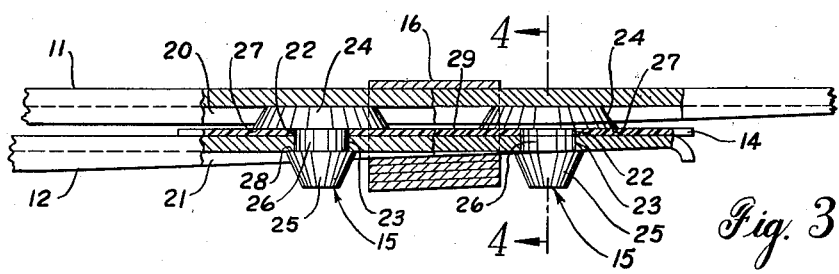
Figure 4:
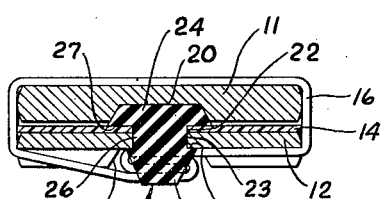

Figure 3 is a front, elevational, partial, cross-sectional view of the spring portion shown in Figure 2, taken substantially along the line 3—3 of Figure 2, looking in the direction of the arrows, and showing one of the rubber dampening buttons in full elevation in its mounted position between adjacent spring leaves; and Figure 4 is an enlarged end cross-sectional view of the spring portion of Figure 3 taken substantially along the line 4—4 of Figure 3.

Figure 1:
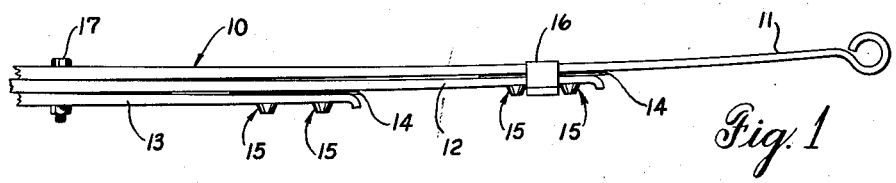
Figure 1 is a partial side elevational view of a typical composite leaf spring construction embodying the features of our invention.

Looking now at Figure 1 of the drawings, it will be observed that a composite leaf spring 10, shown therein, comprises a plurality of individual leaves 11, 12, and 13 having our dampening means inserted between adjacent leaf members thereof; the dampening means including a frictional liner 14 and rubber buttons 15, with the several spring leaves and dampening means being held in assembled position by a conventional leaf strap 16 and a central carriage bolt 17.

The exact construction of the leaf spring 10 is not important to this invention and may comprise any conventional leaf spring construction, however, it is preferred that the individual leaves 11, 12, and 13 substantially embody the features of the spring leaf disclosed in the prior Patent No. 2,026,599, issued to William H. Wallace, wherein the spring leaves are substantially flat on the tension side, having a compression side distinguished by a concavity which is formed by a longitudinal groove, the sides of which are divergent toward the compression side of the spring and which is symmetrically positioned with respect to the edges of the leaf. It will be observed that we have employed a modification of the Wallace construction in our spring leaves, in that the configuration of grooves such as 20 and 21 of the leaves 11 and 12, have a substantially trapezoidal cross section, as shown in Figure 4.

The dampening means, as illustrated in Figure 3, is adapted to be mounted between adjacent leaf members, such as 11 and 12 of that figure, and comprises a frictional liner member 14, preferably of a suitable plastic or other friction producing material of a similar nature. It has been found that a liner 14 made of phenolic plastic compound has the desirable frictional, antisqueak, and wearing qualities, although other equivalent materials may readily be adapted for this use. As herein shown, the liner is substantially a rectangular plate having a pair of circular apertures 22 formed in spaced apart relation therein so as to lie in registering relation with the leaf grooves, such as groove 20 of the leaf spring 11, for the reception therein of the rubber button members 15.

The rubber buttons 15 are adapted to be inserted through the apertures 22 of the liner member 14 for holding the liner in place, as on the spring leaf 12 of Figure 2; corresponding apertures 23 being provided in spaced central registering relation in the lower leaf spring 12. It will be observed that each rubber button 15 has an upper mushroomed head 24, and a smaller lower conical shaped head 25; the two heads being interconnected by a substantially cylindrical, central interconnecting member 26, which is of a smaller diameter than either of the two head members, whereby shoulders 27 and 28 of the upper and lower heads 24 and 25 respectively, are provided for locking the button in position. The upper heads 24 serve to keep the liner 14 in position while the lower heads 25 serve to lock the liner and button to an underlying spring leaf such as 12, as shown in Figure 3 and 4. In the illustration of the dampening means inserted between leaves 11 and 12 of Figure 3, it will be observed that the conical mushroom-shaped upper head 24 of each button member 15 is adapted to be received within the channel 20 of the upper leaf 11 therein, whereby its shape is altered to fit the groove as shown in phantom in Figure 2 of the drawings, when the two leaves 11 and 12 are assembled in the leaf spring. It is intended that the initial load applied to the spring 10 will be entirely absorbed by compression of the heads 24 of the rubber buttons, which will allow a small gap 29 to remain between the liner 14 and the upper leaf 11, as illustrated in Figure 3. As the load on the spring assembly 10 increases, the rubber buttons will be further compressed until the gap 29 is entirely closed and the upper leaf 11 contacts the liner 14, whereby pressure will be exerted thereagainst. For this purpose, the upper heads of the rubber buttons must have the proper thickness to insure that initial contact is made between the heads of the buttons and the bottom of the groove of the overlying adjacent leaf, such as groove 20 of leaf 11, as illustrated in Figures 3 and 4 of the drawings.

In utilizing a dampening means, such as we have described above, it has been found desirable to support approximately seventy per cent of the normal static load by means of the rubber buttons only, without contact being made between the adjacent leaves and the underlying liner. As the load increases beyond the seventy per cent mark, the gaps between the adjacent leaves and liners will become gradually closed until the additional load is supported by the liner 14. It should be recognized as one of the features of our invention, however, that the load on the liners 14 never becomes excessive and is always less than if the rubber buttons had not been used to support the initial static load. Among the advantages of such a dampening device are that it provides a combination of a viscous and a friction dampener between adjacent leaves of a leaf spring construction. The desirable characteristics of the compressible rubber are obtained at the lighter static loads and the additional frictional effects of the liner 14 are obtainable at the heavier loads, such a combined utility of the rubber and the plastic liner making for a more desirable dampening means than if either the rubber buttons or liners had been used separately. Additionally, if the rubber buttons were used alone between the leaves of the spring there would be a tendency of the rubber to take a permanent set due to the heavy loads encountered, which would eventually destroy their resilient utility. Conversely, it is very difficult to find a liner material for use between leaves of a leaf spring which would have the proper wearing qualities. By combining the frictional liner and the resilient rubber buttons in a device such as we have described above, the load is distributed between the buttons and the liners so that each carries only a portion of the load, wherefore the length of service obtained is much greater than if either material were used alone. It should be noted that by the use of our dampening means there is substantial elimination of metal-to-metal contact between the end portions of the leaf members of the spring, where most squeaks normally occur. Such an elimination of metal-to-metal contact makes the use of spring covers unnecessary and eliminates the need for periodic lubrication of the leaf springs to prevent squeaking. It will be further observed that, under flexing action of the leaves of the spring, the buttons with their upper heads housed in the groove sections of the adjacent upper spring leaf, in addition to supporting the initial compressive thrust on the spring, have a tendency to apply resilient frictional resistance along the channel side walls of the grooves in which they are registered. It has been found that by the use of such an expedient the flexing action of the assembled spring leaves is much slower in movement than if the buttons were absent, thus giving the spring a fluid or hydraulic style of flexing actuation which we have herein termed as "viscous dampening." To those familiar with the various problems of designing a leaf spring construction, it will be readily apparent that the viscous dampening of the flexing action of the leaf springs greatly decreases the amplitude of the lateral motion of a vehicle being supported by such a spring, which feature has particular merit in automobiles or the like. Lateral motion or shake in an automobile makes for an unsymmetric type of motion which is coupled to and excited by rear axle tramp, which is a transverse or lateral shaking motion of the axle relative to the automobile. We have found that the use of the viscous dampening of the rubber buttons has greatly reduced the tendency of the rear axle tramp and lateral shake of the automobile. Likewise, longitudinal shake of the automobile is dampened by the buttons. Coupled with the desirable features of the rubber buttons in minimizing longitudinal and lateral shake of the automobile is the inner leaf friction produced by the liners 14, which is effective in reducing power or brake hop and is very effective when applied to the longitudinal motion of the springs to control the vertical amplitude of the car's oscillations. Additionally, it will be apparent that the rubber buttons minimize the static friction and dampen the sliding friction between adjacent leaves of the spring due to impact loads, power, and brake hop.

Thus, it may be observed that we have provided a new and improved viscous and frictional dampening means having particular application between adjacent leaves of composite leaf springs and having the desirable effects, as outlined above. While we have herein shown and illustrated one form in which the teachings of our invention may appear, it will be readily apparent that numerous modifications, changes, and substitutions of equivalents readily may be made without departing from the spirit and scope hereof and, therefore, we do not wish to be limited to the specific materials and structures herein illustrated, except as may appear in the following appended claims.

We claim:

1. In a composite leaf spring having a plurality of superposed spring leaves, a viscous and attritional dampener means, comprising in combination, a plurality of rubber buttons inserted through one underlying leaf of an adjacent pair of said superposed leaves, the upper ends of which buttons are each characterized by a widened head portion, resiliently deformed and compressed registeringly into a recessed groove formed in the underside of the overlying leaf of said pair of leaves, the lower ends of which buttons are insertable through apertures formed in said underlying leaf and are each distinguished by another head portion having a retaining flange portion for deterring axial withdrawal of said buttons from said underlying leaf; and a planar rectangular liner of friction plastic material mounted between adjacent faces of said pair of leaves and underlying said buttons' upper widened head portions so as to be spaced normally from the undersurface of said overlying spring leaf while being held fixedly by said widened head portions to said underlying leaf; said upper widened head portions compressibly resisting the initial static loading of said composite leaf spring and maintaining said overlying leaf in spaced relation to said liner, but compressibly diminishing in height under additional static and dynamic loading of said spring to allow said other leaf to engage frictionally the adjacent surface of said liner whereby oscillating and flexing actions of said spring are resiliently opposed by said buttons and attritionally dampened by said liner.

2. A composite leaf spring of the class described, comprising, at least two superposed spring leaf elements, an attritional liner element inserted intermediate adjacent faces of said leaf elements and into engagement with one of said leaf elements, rubber button-like members, having enlarged head portions at opposite ends of an elongated body portion, insertably mounted through said one of said leaf elements and said liner element, one of said head portions projecting between adjacent leaf elements and being of a thickness for normally maintaining said liner and said other leaf element in spaced relation.

3. In a composite leaf spring comprising a plurality of superposed spring leaves, a dampener means comprising in combination an attritional planar plastic liner member inserted between adjacent faces of a pair of said spring leaves, one of which leaves overlies the other, and compressible rubber button means inserted through said liner and the other spring leaf for securing said liner to said other spring leaf, said button means having an enlarged upper head portion normally deformably compressed into a grooved concavity formed in the lower compression side of said one overlying spring leaf for spacing said liner normally from said one leaf.

References Cited in the file of this patent

UNITED STATES PATENTS

| Number | Name | Date |
|---|---|---|
| 2,221,488 | Paton | Nov. 12, 1940 |
| 2,270,516 | Dow | Jan. 20, 1942 |